June 13, 1972  G. HANSEN  3,669,602
APPARATUS FOR FILLING CONTAINERS OF THERMOPLASTIC
SYNTHETIC MATERIAL
Filed May 12, 1970  2 Sheets-Sheet 1

INVENTOR.
Gerhard Hansen
BY
Watson, Cole, Grindle & Watson
Attys.

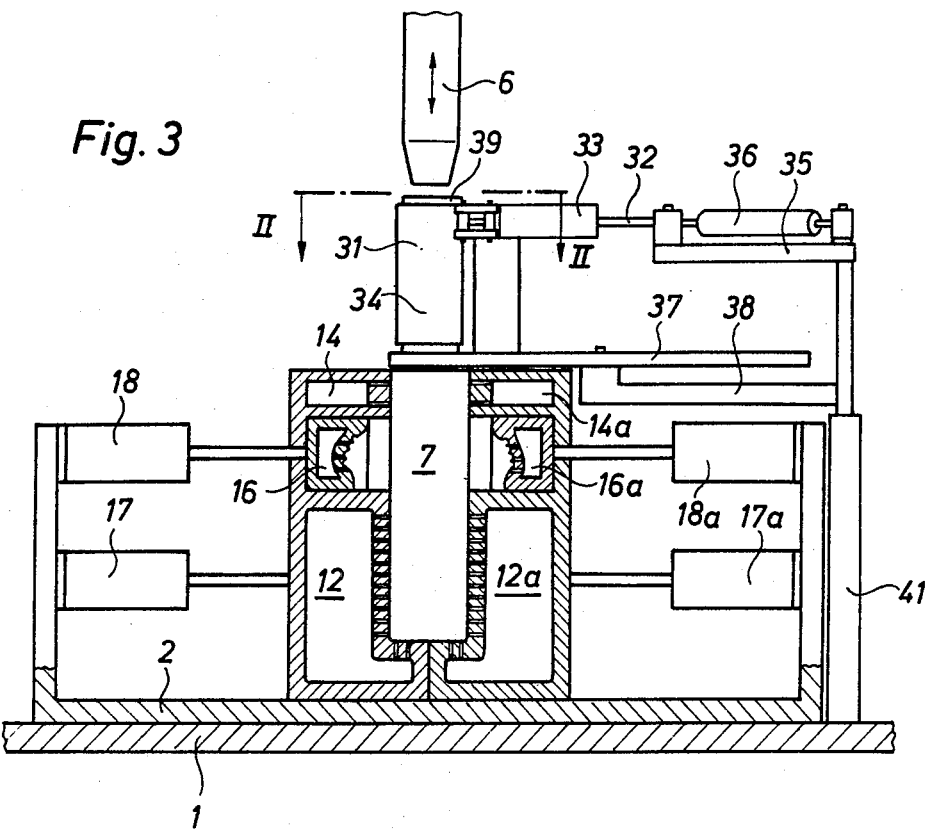

United States Patent Office 3,669,602
Patented June 13, 1972

3,669,602
APPARATUS FOR FILLING CONTAINERS OF THERMOPLASTIC SYNTHETIC MATERIAL
Gerhard Hansen, 47 Hofener Strasse, D7013 Oeffingen Kreis Waiblingen, Germany
Filed May 12, 1970, Ser. No. 36,549
Claims priority, application Germany, May 13, 1969,
P 19 24 338.0
Int. Cl. B29c 5/06; B65b 5/02
U.S. Cl. 425—317
8 Claims

ABSTRACT OF THE DISCLOSURE

The invention concerns an apparatus for the production, filling and closing of a container made from thermoplastic synthetic material, having a container moulding device and having a filling mandrel adapted to be raised and lowered. The apparatus has a grab device for the reception of pieces, particularly elongate pieces of filling material which is adapted to pivot above the container located in the moulding device and serves to feed the filling material into the container.

---

The invention concerns a method and apparatus for the production, filling and closing of a container from thermoplastic synthetic material having a device for the moulding of the container, and a filling mandrel adapted to be raised and lowered.

In a known apparatus the container moulding device has two lower half-moulds connected by holding members for the moulding of the body and base of the container, and upper half-moulds arranged above the lower half-moulds and adapted to displace independently of the former, to mould the head of the container. A plastics tube passing out of a plastics extruding press is received by the holding members under the action of a vacuum, so that the device for moulding the container can be moved to a position below a mandrel which engages in the piece of tube, and which serves to fill the same. The head is closed by means of the upper half-moulds and held during the filling at a distance from the piece of tube, under the action of a vacuum.

The object of the invention is the introduction of particularly elongate pieces of filling material, into the container being produced by the apparatus. This object is achieved according to the invention in that a grab device for the reception of pieces, particularly elongate pieces of filling material is adapted to pivot above the container located in the moulding device, and serves to introduce the filling material into the container. With the apparatus according to the invention, in contrast to known apparatus, it is possible to feed in pieces, particularly elongate pieces, of filling material, for example small sausages, asparagus or the like. For this only one further stage is necessary in the process, wherein the grab device is operated and which is interposed between the production of the body of the container on the one hand and the closing of the head of the container, on the other hand, the further introduction of liquid or powdery substance taking place by means of the filling mandrel before or after this.

A further feature of the invention is that the grab device for the introduction of the filling material into the container pivots below the filling mandrel. The operational position of the moulding device for the introduction of pieces of material is in consequence the same as for the introduction of the rest of the filling by means of the filling mandrel.

A mechanical feed of the filling material is possible in an advantageous manner, in that the grab device has pivotable tongs which serve to withdraw the filling material from a feed device arranged adjacent the device for moulding the container. The piece of material can be brought onto this feed device in a particular position by hand or mechanically. The mechanical feed contributes to the automation of the method.

The invention further provides that the outer diameter of the filling mandrel is somewhat smaller than the inner diameter of the jaws of the tongs in the gripping position. In this way the filling material can be pushed out of the tongs by the mandrel. As the filling material is held by the tongs until leaving the same the free fall thereof into the container is thereby lessened. This can also be obtained in that the tongs are designed with an outer diameter which, in the gripping position, is smaller than the inner diameter of the piece of tube located above the body of the container and serving to form the head and is extended in the direction of the container and in that the tongs can be lowered into the piece of tube and lifted therefrom.

Further advantageous features will emerge from the following decription of the apparatus in conjunction with the claims and the accompanying drawings. An apparatus for the production, filling and closing of a container made from thermoplastic synthetic material is shown schematically in the drawings as an embodiment, by way of example only, of the subject matter of the invention;

FIG. 3 is a section similar to FIG. 1 to illustrate another embodiment of the invention.

Figure 1:
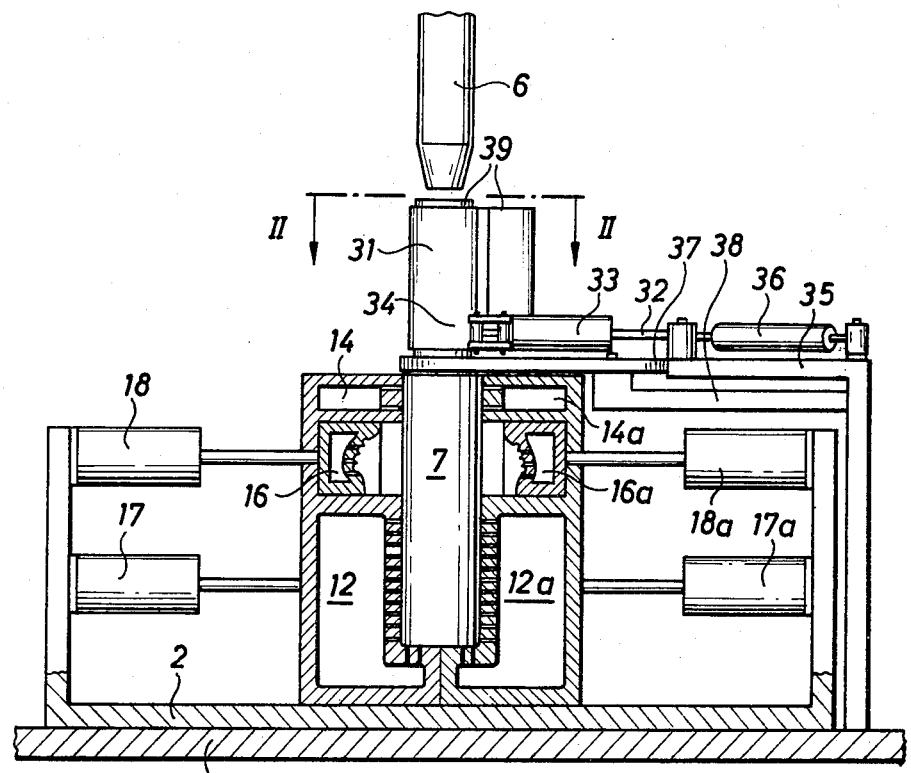
FIG. 1 is a section along line I—I in FIG. 2.
Figure 2:
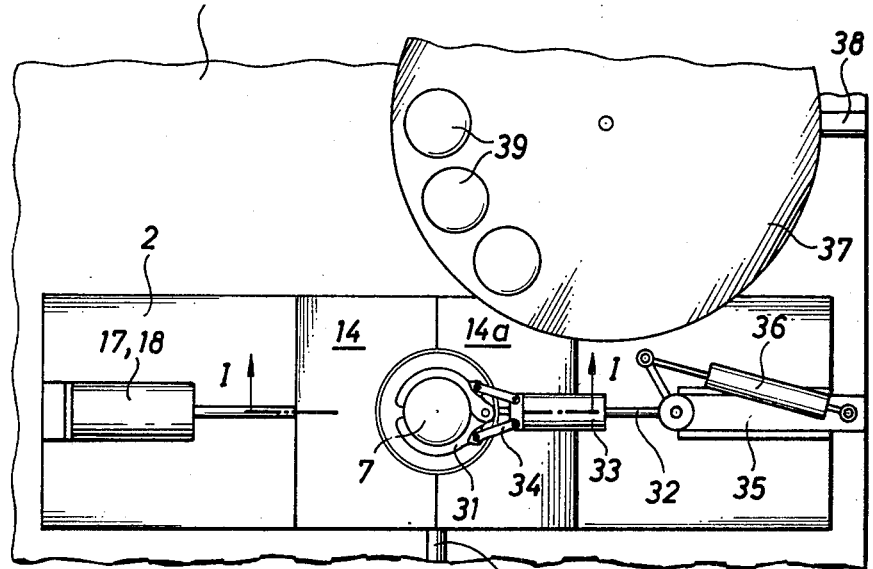
FIG. 2 is a top-plan view in the direction of the arrows II—II in FIG. 1.

A carriage 2 is adapted to be displaced on a table 1 by means of a work cylinder 3 operated hydraulically or pneumatically, from a position below the mouth piece of an extruder press (not shown) into a position below a feed and filling device mounted on the table 1 and adapted to be raised and lowered, and which has a filling mandrel 6. The extruder press serves for the production of a plastics tube 7 of polyethylene, polyvinyl chloride or the like and has at its mouth piece a knife to cut-off the plastics tube. Conduits (not shown) are attached to the filling device having the mandrel 6 and are connected on the one hand to a source of compressed air and on the other hand to a reservoir of filling material.

The carriage 2 carries two lower half-moulds 12 and 12a adapted to be displaced transverse to the direction of displacement of the piston of the work-cylinder 3. A vacuum chamber 14, 14a is connected respectively to each of the lower half-moulds 12, 12a, by means of a connecting piece, and whose cylindrical shape adjacent the piece of tube 7 to be received, is provided with suction jets. The part having the suction jets may have a larger clear diameter than the lower half-moulds 12, 12a, whereby the piece of tube in its region outside these half-moulds is upwardly widened into the shape of a cone. The part having the suction jets may itself be suited to the shape of the cone. Upper half-moulds 16, 16a for the production of the head of the container are located between the vacuum chambers 14, 14a and the lower half-moulds 12, 12a and are adapted to be displaced on the latter. The lower half-moulds 12, 12a are adapted to be displaced on the carriage 2 by means of work cylinders 17, 17a and the upper half-moulds 16, 16a, by means of a work cylinder 18, 18a respectively, on the lower half-moulds 12, 12a. The lower half-moulds 12, 12a and the upper half-moulds have suction jets which, like the suction jets of the vacuum chambers 14, 14a, are adapted to be attached to a source of vacuum.

In FIG. 1, the moulding device 12, 12a, 16, 16a is shown located below the filling mandrel 6 of the filling device. A pair of tongs which has jaws 31, which are articulated on a pivotable carrier 32, is shown between the filling mandrel 6 and the moulding device. The jaws 31 of the tongs are adapted to be operated by means of a reciprocating, hydraulic or pneumatic work cylinder 33, whose piston is secured to the tong-carrier 32, and whose cylinder cover is displaceable against the tong-carrier 32. The work cylinder 33 is connected to the jaws 31 by means of link bars 34. The jaws 31 of the tongs are shown projecting upwardly above the link bars 34. In a pair of tongs adapted to be raised and lowered, they are lengthened, conveniently, to the other end.

The tong-carrier 32 is rotatably mounted on a support block 35. A reciprocating, hydraulic, or pneumatic work cylinder 36 engages on a lever of its bearing part, by means of which the tongs can be pivoted from its position shown in the drawing to a plate of a feed device. The plate 37 is rotatably mounted on a support 38 and is adapted to be driven intermittently and in synchronism with the movements of the tong-carrier 32 in a manner which is not illustrated. The plate 37 carries elongated pieces 39 of filling material for example small sausages, asparagus, or the like.

The extruder press (not shown) delivers a piece of tube 7. As soon as this is of sufficient length, the lower half-moulds 12, 12a located below the extruder press move together and receive the piece of tube 7 between them as shown in FIG. 1. The upper half-moulds 16, 16a are on movement of the lower half-moulds, taken along with the latter, without however being brought into their closed position. The piece of tube is held at its upper end onto the wall of the vacuum chambers 14, 14a due to the vacuum therein before it is cut by the knife (not shown), from the length passing out of the extruder press, to the desired length. Due to the action of the vacuum present in the lower half-moulds 12, 12a, the piece of tube 7 rests against their walls whereby the body of the container is formed. The partly closed mould travels below the filling mandrel 6 of the filling device and below the tongs 31, which have gripped a piece 39 of filling material.

The tongs either allow the piece of filling material to fall into a pre-formed body of the container or the filling mandrel 6 pushes the piece of filling material downwardly, if desired under reduced holding power from the tongs 31, whereby the free fall of the piece is lessened. The holding power of the tongs may, for example, be lessened by decreasing the pressure in the work-cylinder 33. Powdery or liquid filling material may subsequently be introduced into the body of the container by means of the filling mandrel 6. As soon as the latter is raised above the upper half-moulds 16, 16a the latter close to mold the head of the container. For its formation, the corresponding region of the piece of tube, which is still pliable, is held against the upper mould 16, 16a by suction. After closure of the container by the completion of its head piece, the source of vacuum is switched off and the halves 12, 12a of the lower mould and the halves 16, 16a of the upper mould open and return to their position of rest. On the opening of the mould the filled container falls downwardly through holes in the carriage 2 and in the table 1. The mould 12, 12a, 16, 16a and the vacuum chambers 14, 14a return to their position below the mouth piece of the extruder press for the reception of a fresh piece of tube 7.

As soon as the filling mandrel 6 is raised to a position above the pivotal path of the tongs 31, the latter are pivoted into a position adjacent the plate 37 where the tongs may grip the next cylindrical filling piece 39 by closure. The tongs are then returned to the position shown in the drawing. The plate 37 then rotates through an angle corresponding to the arrangement of the filling material whereby the next piece 39 is brought into the gripping range of the tongs 31. The path travelled by the carrier 32 of the tongs is limited by stops (not shown).

The movements of the upper and lower half-moulds 12, 12a, 16, 16a and of the filling mandrel of the filling device 6, of the tongs 31 and of the plate 37, as well as the signals for the filling of the goods to be filled are controlled by means of end stops, time relays and like switches. The process for the production of a container and all subsequent containers can therefore take place automatically.

In order to lessen the free fall of the filling from the tongs 31 into a container, the tongs may be extended in the direction of the container as shown in FIG. 3, and mounted for vertical movement so that they may be raised and lowered by raising and lowering means broadly designated by the reference numeral 41. The outer diameter of the tongs, forming if desired a cylinder in the loosely gripping position, is smaller than the inner diameter of the container. On lowering, the tongs engage within the container and are removed from the container 7 before the closure of the mould-halves 16, 16a forming the head. If there is enough room, the jaws of the tongs may open slightly within the container to release the piece of filling material. It is also possible, if desired, by suitable design of the filling mandrel 6 to utilize this to push the piece out of the tongs when slightly open.

The piece of tube may also be inflated by inner pressure in the region of the body of the container. For this purpose the latter has a slightly strangulated neck part on which to rest the mandrel 6. If desired the mandrel, having introduced the filling material, returns to its initial position before the tongs 31 are pivoted into position. The tongs are preferably lowered to the neck part of the body of the container and slightly opened, so that the filling material held by the tongs can be pushed therefrom by the mandrel 6. The neck part of the container has, meanwhile, cooled to such an extent that the piece of filling material can slide through without damaging it. Subsequently, powdery or liquid filling, as desired, may be added via the filling mandrel 6. After removal of the tongs 31 and the filling mandrel 6 from the piece of tube 7, the head of the container is then closed and moulded under the action of the half-moulds 16, 16a provided therefor.

I claim:

1. In an apparatus for moulding, filling and closing of a container made from a thermoplastic material, said apparatus including mould assembly for forming a container, means for supplying thermoplastic material to be moulded to said assembly, and mandrel means spaced horizontally from said thermoplastic material supply means, said mould assembly being mounted for relative horizontal movement between a position adjacent the thermoplastic material supply means and a position beneath said mandrel, said mandrel being mounted for vertical movement toward and away from the mould assembly when the latter is disposed therebeneath, the combination with said mould assembly, thermoplastic material supply means and mandrel means of means for introducing filling material into a container, said introducing means comprising grab means operable for selectively grabbing and releasing pieces of fill material and pivot means mounting the grab means for pivotal movement above a container disposed in said mould assembly.

2. An apparatus according to claim 1 wherein the grab means is mounted for pivotal movement below the filling mandrel.

3. An apparatus according to claim 1 wherein the grab means comprises an openable and closable pair of tongs, said introducing means including a feed device disposed adjacent the moulding device, said grab means being pivotally movable into a position to receive filling material from said feed device.

4. An apparatus according to claim 3 wherein is included work cylinder means coupled with the grab means for pivoting the latter and for opening and closing the tongs.

5. An apparatus according to claim 4 wherein the tongs are configured to substantially encircle the filling material and have a length which corresponds approximately to the length of the piece of material to be supported thereby.

6. An apparatus according to claim 3 wherein the outer diameter of the filling mandrel is smaller than the inner diameter of the tongs when the latter are in a loosely gripping position.

7. An apparatus according to claim 3 wherein the tongs are configured to have an outer diameter when closed which is less than the diameter of the upper portion of the container serving for the formation of the head, said tongs being mounted for vertical movement whereby they may be lowered into said upper portion and withdrawn therefrom.

8. An apparatus according to claim 3 wherein the tongs each includes a mounting arm and each extends downwardly from its arm toward a container in the mould assembly.

References Cited
UNITED STATES PATENTS

| | | | |
|---|---|---|---|
| 958,394 | 5/1910 | Heller | 53—239 |
| 3,245,806 | 4/1966 | Miller | 53—35 X |
| 3,196,593 | 7/1965 | Hey | 53—140 |
| 3,325,860 | 6/1967 | Hansen | 53—140 X |
| 3,357,046 | 12/1967 | Pechthold | 53—140 X |

ROBERT L. SPRUILL, Primary Examiner

U.S. Cl. X.R.

53—140, 191; 425—388